US009126775B2

(12) United States Patent
Brooks et al.

(10) Patent No.: US 9,126,775 B2
(45) Date of Patent: Sep. 8, 2015

(54) LATCHING MECHANISMS FOR REMOVABLE CHOCKS (75) Inventors: Andrew Brooks, Thiensville, WI (US); Ben Wieberdink, Cedar Grove, WI (US); Kurt Lessard, South Milwaukee, WI (US); Timothy Cotton, Milwaukee, WI (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 371 days.

(21) Appl. No.: 12/751,648

(22) Filed: Mar. 31, 2010

(65) Prior Publication Data

US 2011/0240416 A1 Oct. 6, 2011

(51) Int. Cl.
*B60T 3/00* (2006.01)
*B65G 69/00* (2006.01)
*B60T 1/00* (2006.01)
*B60T 1/14* (2006.01)

(52) U.S. Cl.
CPC ............. *B65G 69/005* (2013.01); *B60T 3/00* (2013.01); *B60T 1/14* (2013.01)

(58) Field of Classification Search
CPC .............. B60T 1/00; B60T 1/02; B60T 1/04; B60T 1/14; B60T 3/00; F16D 63/00
USPC .................. 188/4 R, 5, 31, 32, 35, 36, 62, 63
See application file for complete search history.

(56) References Cited

U.S. PATENT DOCUMENTS 1,279,254 A * 9/1918 Carlson ........................... 188/36
4,679,974 A * 7/1987 Blunden ......................... 410/30
4,766,692 A * 8/1988 Shurden ........................... 43/78
6,227,512 B1 * 5/2001 Andre et al. ............. 248/346.01
2005/0145446 A1 * 7/2005 Anderson et al. ............... 188/32
2006/0144649 A1 7/2006 Jette
2006/0241618 A1 * 10/2006 Gasser et al. ................... 606/72

(Continued)

FOREIGN PATENT DOCUMENTS

CA 2494898 9/1993
CA 2638368 1/2009

(Continued)

OTHER PUBLICATIONS

International Searching Authority, "International Search Report," issued in connection with international application serial No. PCT/US2011/029941, mailed Jun. 29, 2011, 6 pages.

(Continued)

*Primary Examiner* — Melody Burch
(74) *Attorney, Agent, or Firm* — Hanley, Flight and Zimmerman, LLC (57) ABSTRACT Example wheel restraint systems include example wheel chocks for blocking a wheel of a vehicle at a loading dock. In some examples, the wheel chock is movable between a stored position and a wheel-blocking position. In the wheel-blocking position, the chock latches onto a track that is mounted to a driveway of the loading dock. In the stored position, the chock is spaced apart from the track. In some examples, a lifting mechanism, such as a hoist or a spring-loaded articulated arm, helps carry at least some of the chock's weight as the chock is manually moved between its stored and wheel-blocking positions. In some examples, the chock includes a rotatable lever for selectively latching and unlatching the chock to the track.

16 Claims, 8 Drawing Sheets

(56) References Cited

U.S. PATENT DOCUMENTS

2009/0035088 A1* 2/2009 Powers et al. .................... 410/30
2010/0170754 A1* 7/2010 Brooks et al. .................... 188/32
2010/0260586 A1 10/2010 Manone et al.

FOREIGN PATENT DOCUMENTS

| DE | 19603657 | 8/1997 |
| WO | 9744220 | 11/1997 |
| WO | 2009014815 | 1/2009 |

OTHER PUBLICATIONS

International Searching Authority, "Written Opinion of the International Searching Authority," issued in connection with international application serial No. PCT/US2011/029941, mailed Jun. 29, 2011, 7 pages.

International Bureau, "International Preliminary Report on Patentability," issued in connection with international application serial No. PCT/US2011/029941, mailed Oct. 11, 2012, 8 pages.

* cited by examiner

LATCHING MECHANISMS FOR REMOVABLE CHOCKS

FIELD OF THE DISCLOSURE

This patent generally pertains to wheel chocks and, more specifically, to latching mechanisms for removable chocks.

BACKGROUND

When a truck, trailer or some other vehicle is parked at a loading dock, often a vehicle restraint is used to keep the truck from inadvertently moving away from an elevated platform of the dock. This allows a forklift truck to safely drive between the dock platform and the truck for the purpose of loading or unloading the cargo inside the truck.

There are different vehicle restraints available that can be installed at a loading dock for engaging the truck's RIG (Rear Impact Guard), also known as an ICC bar. An ICC bar is a beam that extends horizontally across the rear of a truck, just below the truck bed. Its primary purpose is to prevent an automobile from under-riding the truck in a rear-end collision. However, not all trucks have an ICC bar that can be readily engaged by an ICC-style restraint. Moreover, ICC bars are not prevalent outside the United States, so in those cases a wheel chock can be used for blocking one or more of the truck's wheels. Although wheel chocks can be useful in such applications, they do have their limitations.

DETAILED DESCRIPTION

Figure 5:
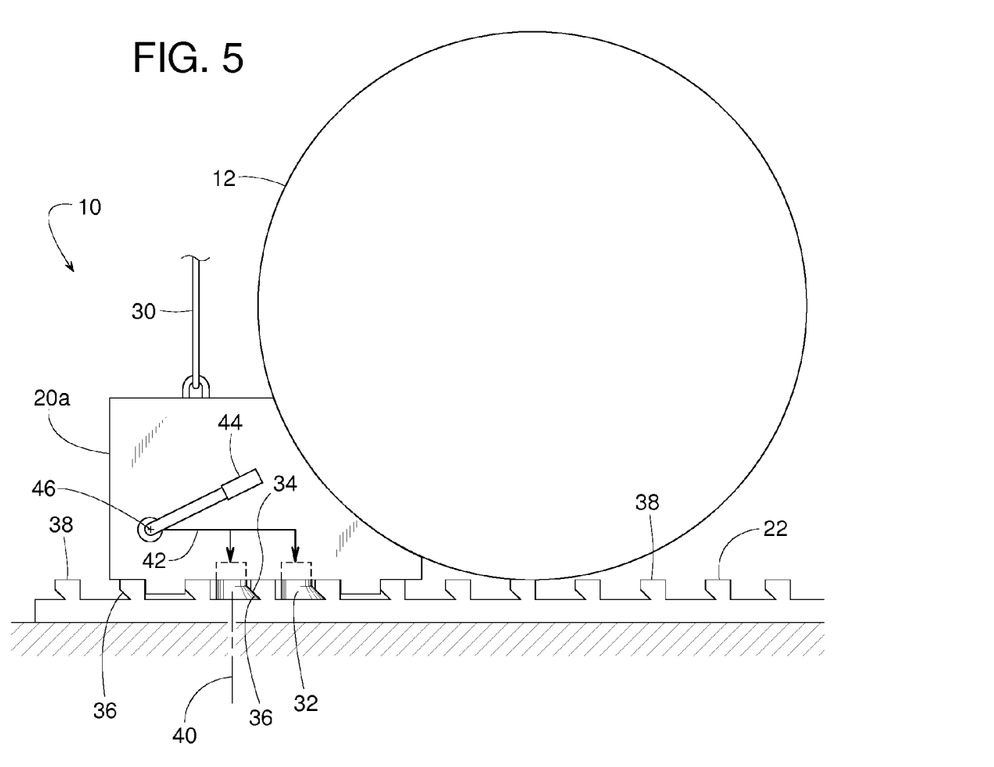
FIG. 5 is a side view similar to FIG. 3 but showing the latches in their latched position.
Figure 6:
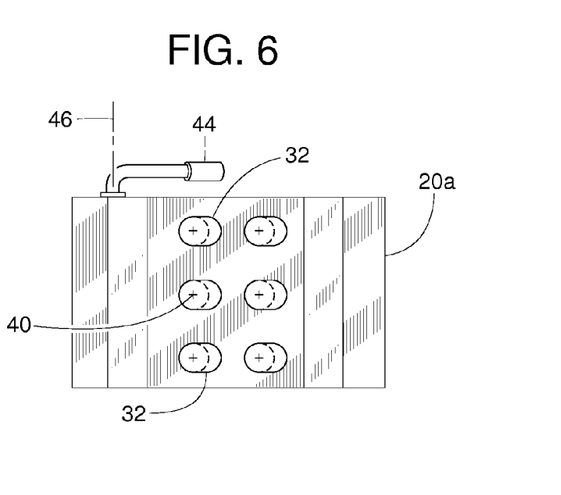
FIG. 6 is a bottom view of the example wheel chock of FIG. 5 with the chock's latches shown in their latched position.
Figure 7:
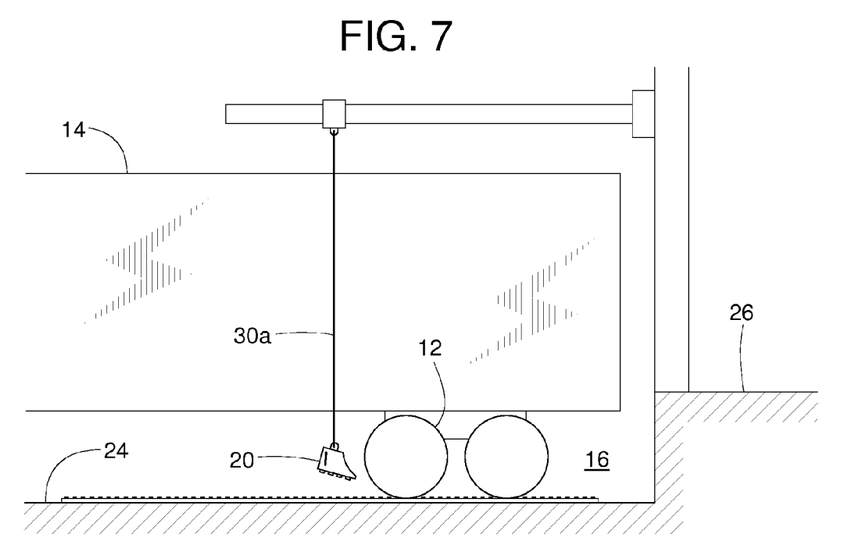
FIG. 7 is a side view showing an example lift mechanism supporting an example wheel chock disclosed herein.
Figure 8:
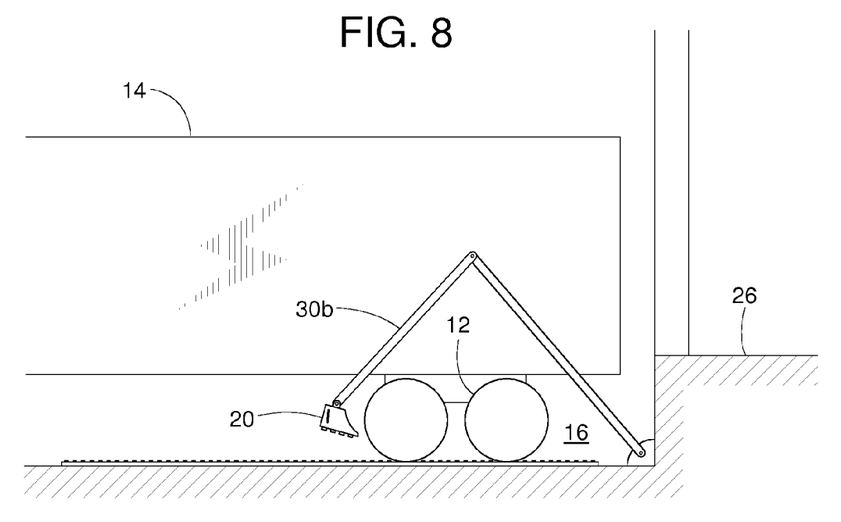
FIG. 8 is a side view showing another example lift mechanism supporting an example wheel chock disclosed herein.

FIGS. 1-6, with reference to FIGS. 7 and 8, show an example wheel restraint system 10 for blocking a wheel 12 of a vehicle 14 (e.g., truck, trailer, etc.) at a loading dock 16. Wheel restraint system 10 includes an example wheel chock 20a that is movable between a wheel-blocking position (e.g., FIGS. 3 and 5) and a stored position (e.g., FIGS. 1, 2 and 7).

Figure 3:
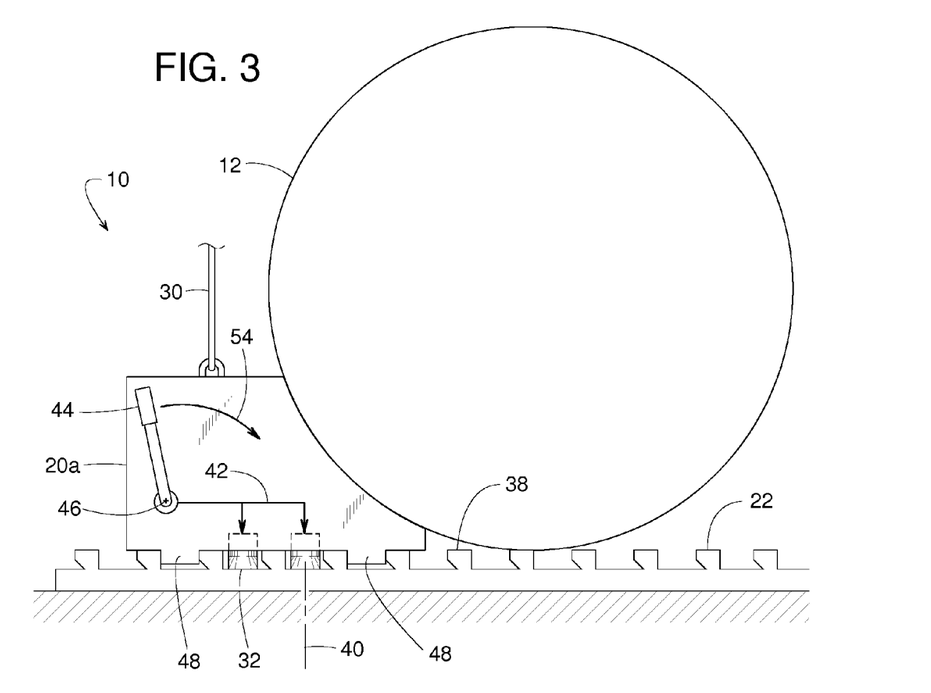
FIG. 3 is a side view of the example wheel chock of FIGS. 1 and 2 showing the chock on the track.

In the wheel-blocking position, chock 20a engages a track 22 mounted to a driveway 24 of dock 16 to limit movement of vehicle 14 away from an elevated platform 26 of dock 16. To block wheels that may stop at different distances from platform 26, chock 20a can be placed at different wheel-blocking positions along a length of track 22.

To release vehicle 14, chock 20a is moveable to any suitable stored position where chock 20a is spaced apart or disengages from track 22. Examples of stored positions include, but are not limited to, chock 20a being suspended above and off to one side of track 22, chock 20a being off to one side of track 22 and resting upon driveway 24, or chock 20a resting upon a shelf, cradle or hanging from a hook at some chosen location at dock 16.

Figure 1:
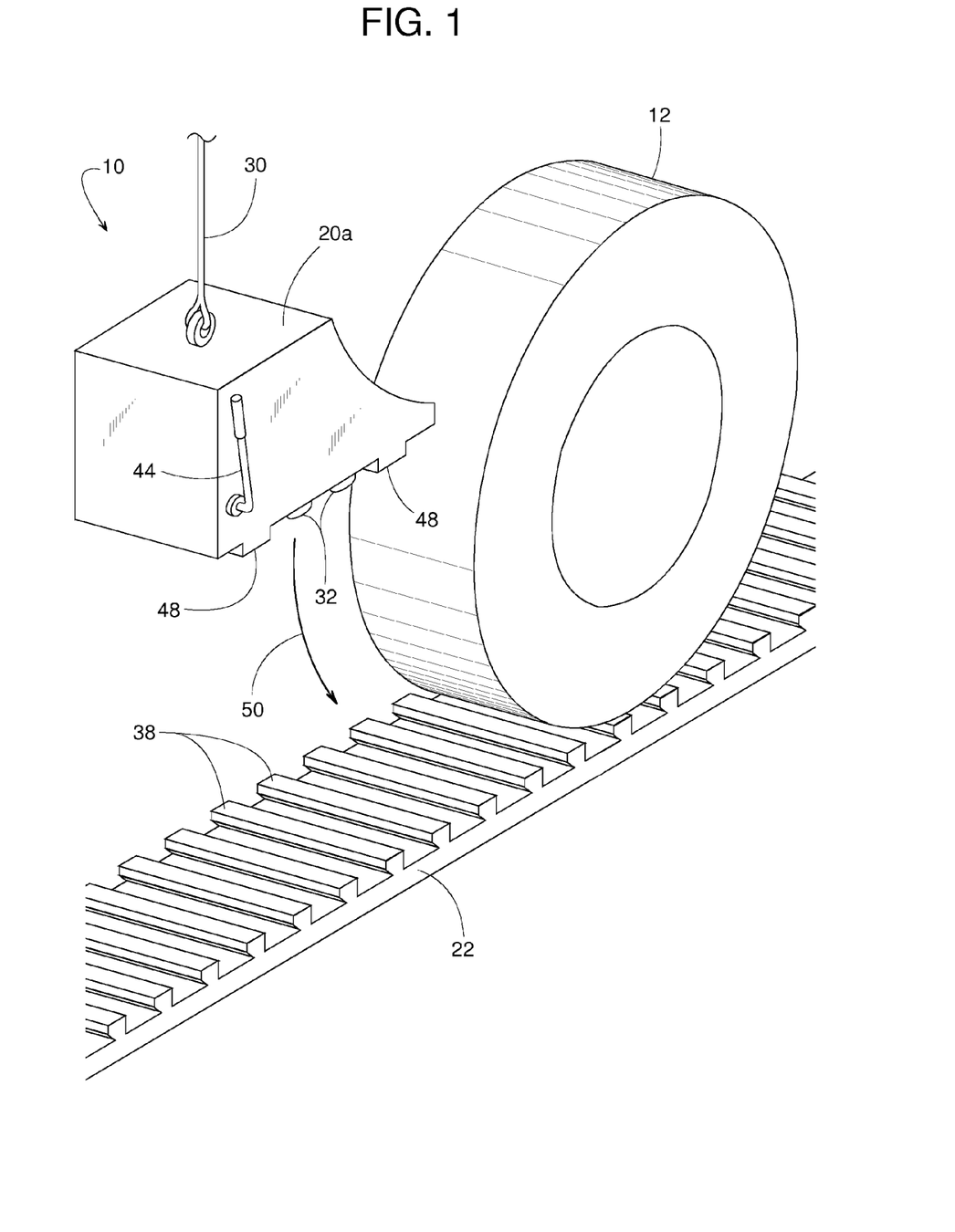
FIG. 1 is a perspective view of an example wheel restraint system with an example wheel chock, both of which are disclosed herein.

To facilitate movement of wheel chock 20a between the stored position and wheel-blocking position, chock 20a can be connected to a lift mechanism 30 that carries at least some the chock's weight. Lift mechanism 30 is schematically illustrated in FIGS. 1, 3 and 5 to represent different example lift mechanisms. Examples of lift mechanism 30 include, but are not limited to, a hoist 30a (FIG. 7) or a spring-loaded articulated arm 30b (FIG. 8), both of which are shown supporting an example wheel chock 20 at dock 16.

Figure 2:
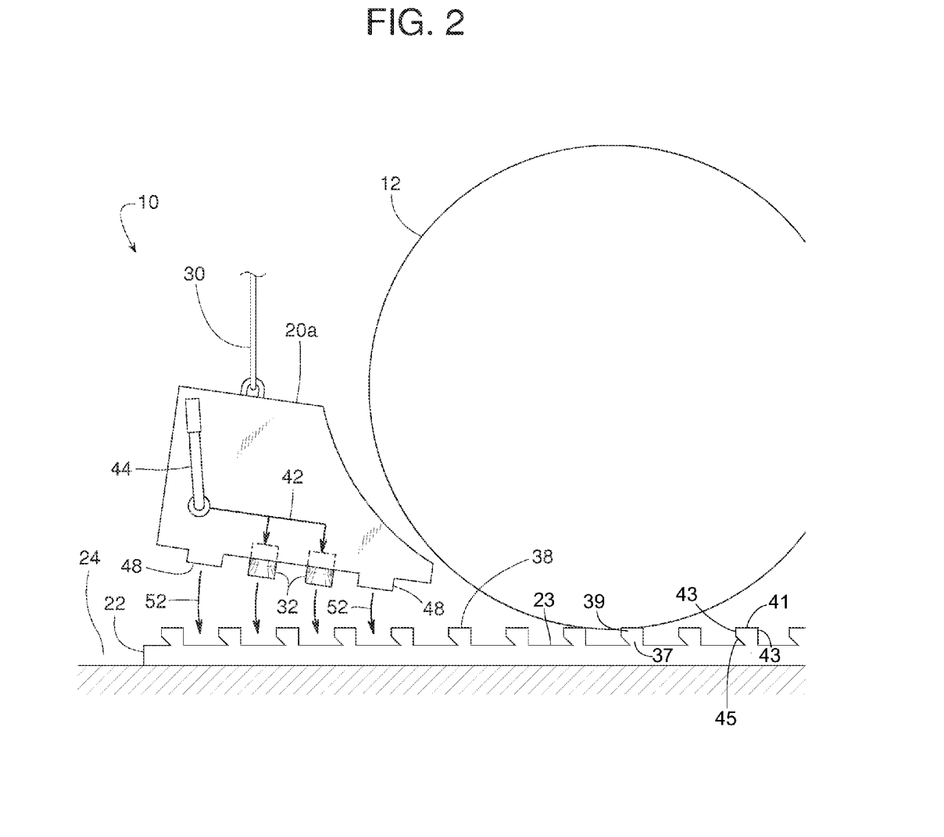
FIG. 2 is a side view of the example wheel chock of FIG. 1 being lowered relative to a track.
Figure 9:
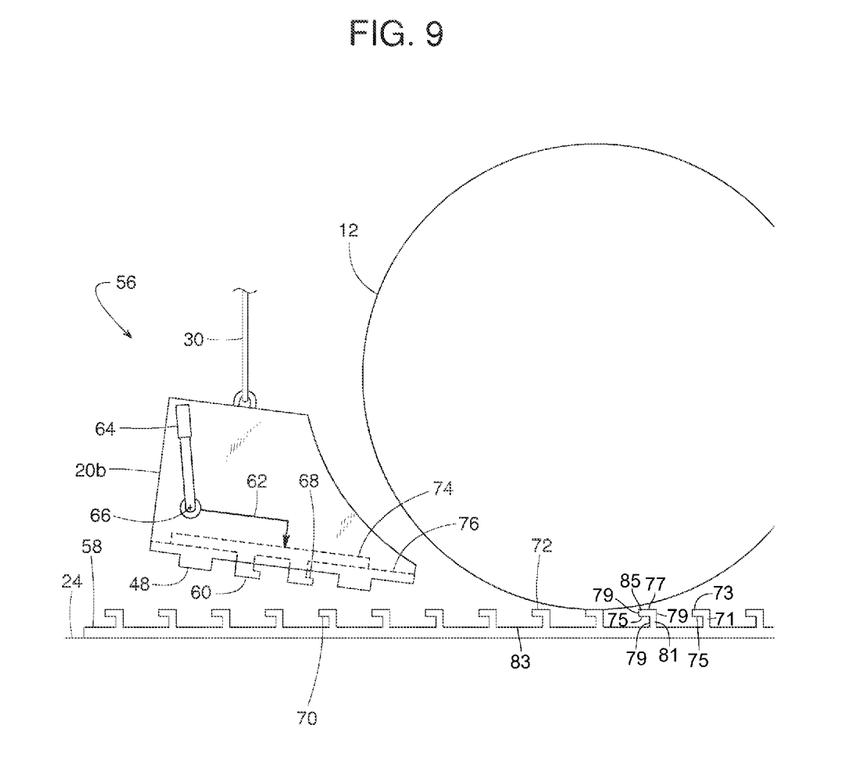
FIG. 9 is a side view similar to FIG. 2 but showing another example wheel restraint system with another example wheel chock, both of which are disclosed herein.

In the example of FIGS. 1-6, an example latch member or mechanism 32 is attached to wheel chock 20a to help hold chock 20a at a selected wheel-blocking position by virtue of a first or an upward facing surface 34 (FIG. 5) of latch member 32 engaging (e.g., frictionally engaging) a second or downward facing surface 36 of a catch 38 on track 22. Although some clearance may initially exist between surfaces 34 and 36, their engagement with each other can be the result of wheel 12 attempting to move, push or tip chock 20a back relative to track 22 or can be the result of some external force trying to tip or lift chock 20a. In the illustrated example of FIG. 2, the catch 38 protrudes from a surface 23 (e.g., an upper surface) of the track 22. The catch 38 of the illustrated example includes a first portion 37 (e.g., a base portion) and a second portion 39 (e.g., a top portion). In the illustrated example, the second portion 39 overhangs the first portion 37. For example, as shown in FIG. 2, the catch 38 includes an upper surface 41, side surfaces 43, and an angled or tapered surface 45 (e.g., also identified as downward facing surface 36 in FIG. 2). As shown, the side surfaces 43 extend from respective ends of the upper surface 41. The angled or tapered surface 45 extends between an end of one of the side surfaces 43 and the surface 23 of the track 22. The other one of the side surfaces 43 extends between the upper surface 41 and the surface 23 of the track 22. In some examples, such as shown in FIG. 9 below, the catch 38 has an L-shaped profile (e.g., a projection without the angled surface 47, but having a second portion overlapping a first portion).

Figure 4:
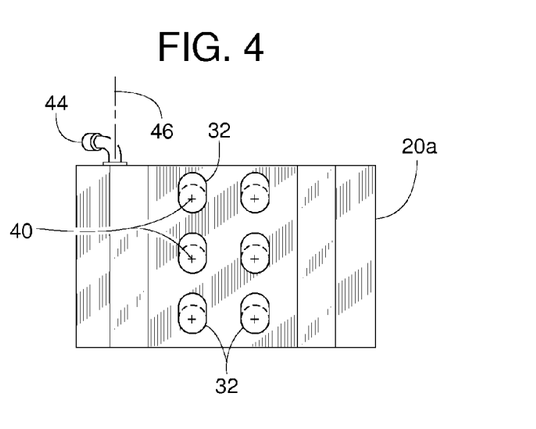
FIG. 4 is a bottom view of the example wheel chock of FIG. 3 with the chock's example latches shown in their unlatched position.

In this example, catch 38 is one of a plurality of catches, and latch member 32 is one of a plurality of latch members. Each latch member 32 is movable (relative to, or within, a body or housing of chock 20a) between a latched position (FIGS. 5 and 6) and an unlatched position (FIGS. 3 and 4). In this example, the movement of latch member 32 is by rotation about an axis 40 (FIG. 6). In some examples, a drive mechanism 42 couples latch member 32 to a lever 44 that can be manually rotated about a second axis 46 between a lock position (FIGS. 5 and 6) and an unlock position (FIGS. 1-4) such that lever 44 rotating between the unlock position and the lock position rotates latch member 32 between the unlatched position and the latched position. In this example, the axis 40 and the second axis 46 are displaced out of parallel alignment with each other. Drive mechanism 42 is schematically illustrated to represent a device that can transfer the movement of lever 44 to latch member 32. Examples of drive mechanism 42 include, but are not limited to, a set of bevel gears, rack and pinion, suitable linkage assembly, etc. Further, actuation of lever 44 is illustratively shown as entailing rotational movement but could, alternatively, entail sliding movement if lever 44 is reconfigured into a push-pull mechanism. In either configuration, movement of lever 44 causes latch member 32 to move between the unlatched position and the latched position.

In operation, while wheel chock 20*a* is in a stored position at some location clear of the wheel's path, vehicle 14 backs into dock 16 and stops wheel 12 somewhere along the length of track 22. While latch member 32 is in the unlatched position, as shown in FIGS. 2-4, a dockworker moves wheel chock 20*a* from the stored position to the wheel-blocking position of FIG. 3. Latch member 32 being in the unlatched position (FIGS. 2, 3 and 4) allows each latch member 32 and alignment keys 48 to engage or readily fit among the plurality of catches 38. In this example, after wheel chock 20*a* is engaged with or set upon track 22, the dockworker moves lever 44 from the unlock position (FIG. 3) to the lock position (FIG. 5), which moves latch member 32 from the unlatched position (FIGS. 3 and 4) to the latched position (FIGS. 5 and 6). Downward facing surface 36 of catch 38 overhanging upward facing surface 34 of latch member 32 helps hold wheel chock 20*a* to track 22 via interference fit so that wheel chock 20*a* can reliably block the vehicle's forward movement away from dock platform 26.

To release vehicle 14, lever 44 can be moved from the lock position to the unlock position, which moves latch member 32 from the latched position to the unlatched position. This allows wheel chock 20*a* to be readily removed out from within the plurality of catches 38 of track 22 and, thus, allows wheel chock 20*a* to be lifted or otherwise moved from the wheel-blocking position to a stored position.

It should be noted that arrow 50 of FIG. 1 represents lowering the wheel chock 20*a* onto the track 22, arrows 52 of FIG. 2 represent positioning the wheel chock 20*a* in wheel-blocking proximity with a wheel of vehicle 12, and arrow 54 of FIG. 3 represents latching the wheel chock 20*a* to the track 22 after lowering the wheel chock 20*a* into engagement or onto the track and after positioning the chock 20*a* in wheel-blocking relationship with the wheel of the vehicle 12.

Figure 10:
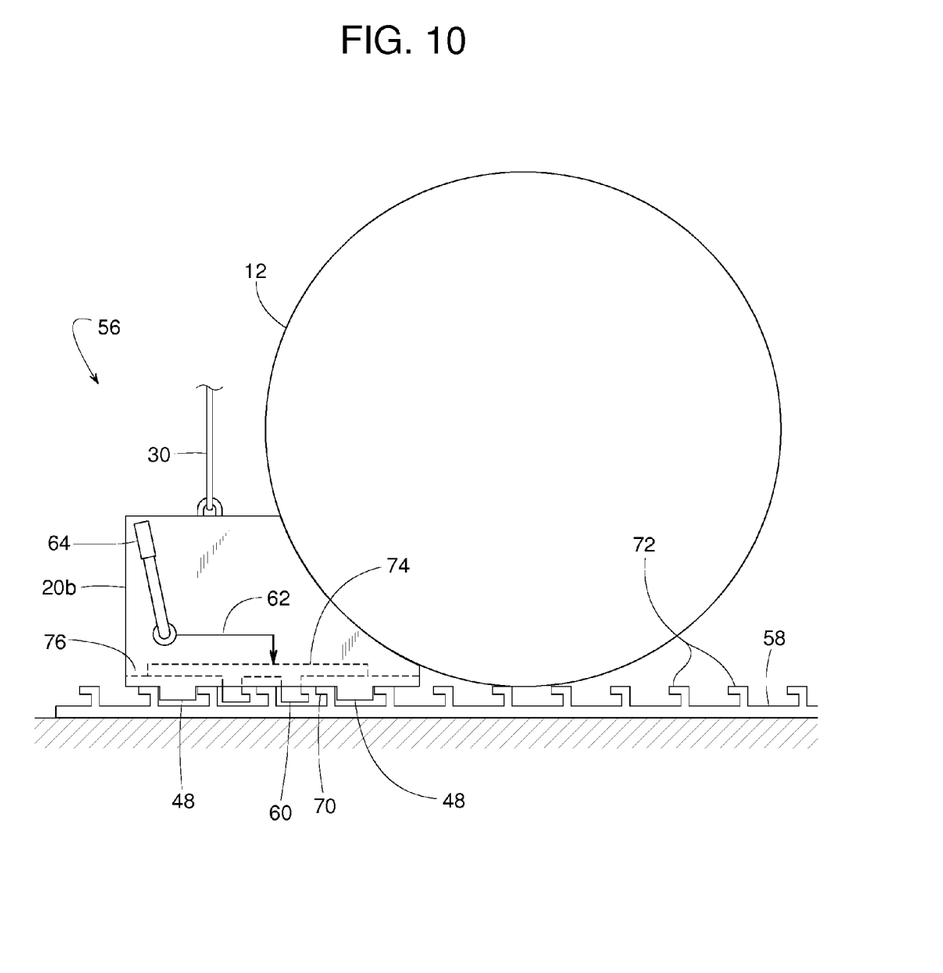
FIG. 10 is a side view of the example wheel chock shown in FIG. 9.
Figure 11:
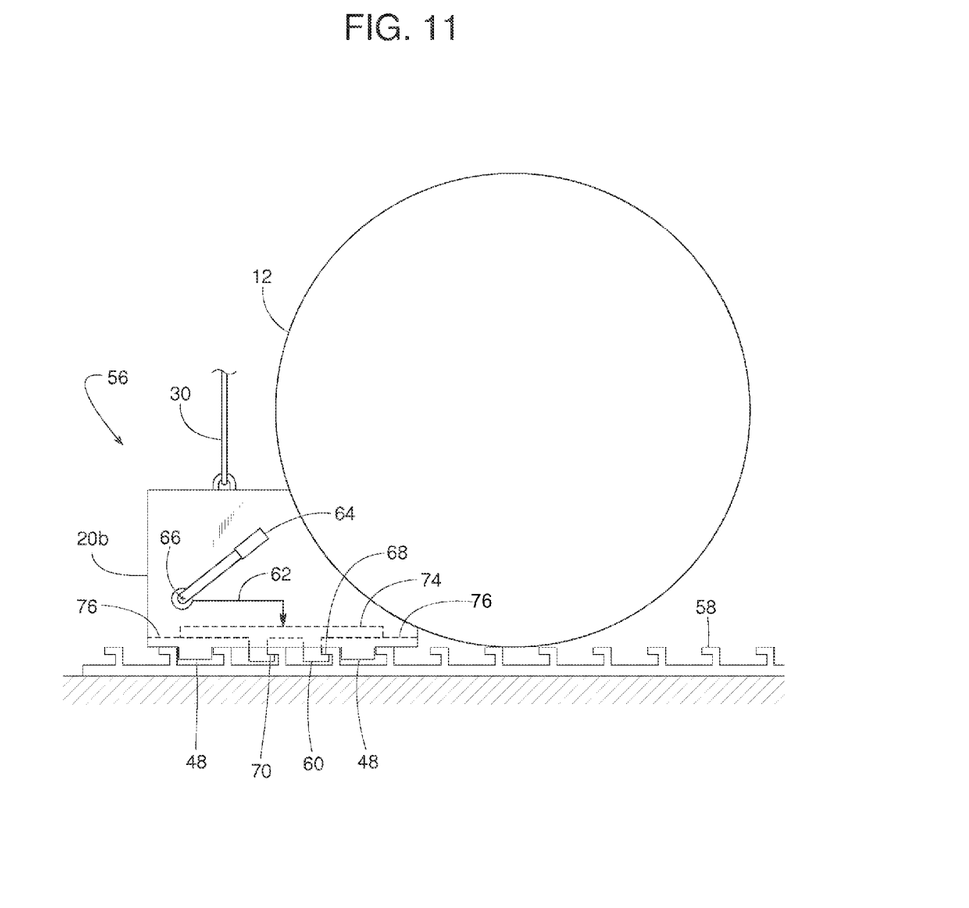
FIG. 11 is a side view of the example wheel chock of FIGS. 9 and 10 but showing the chock's example latches in their latched position.

FIGS. 9-11 show an example wheel restraint system 56 comprising a track 58 mountable to driveway 24, a wheel chock 20*b* movable between a stored position (FIG. 9) and a wheel-blocking position (FIGS. 10 and 11), and a latch member 60 movable between an unlatched position (FIGS. 9 and 10) and a latched position (FIG. 11). In this example, latch member 60 is movable in translation relative to chock 20*b*.

In some examples, a drive mechanism 62 couples latch member 60 to a lever 64. The lever 64 can be manually rotated about an axis 66 between an unlock position (FIGS. 9 and 10) and a lock position (FIG. 11) such that lever 64 rotating between the unlock position and the lock position shifts latch member 60 between the unlatched position and the latched position. Drive mechanism 62 is schematically illustrated to represent any device that can transfer the movement of lever 64 to latch member 60. Examples of drive mechanism 62 include, but are not limited to, a rack and pinion, suitable linkage assembly, etc.

In the latched position (FIG. 11), an upward facing surface 68 of latch 60 engages a downward facing surface 70 of a catch 72 of track 58 to help prevent wheel 12 from moving or pushing chock 20*b* out of engagement with track 58. Although some clearance may initially exist between surfaces 68 and 70, their engagement with each other can be caused by wheel 12 attempting to push or tip chock 20*b* back relative to track 58 or can be caused by some external force trying to tip or lift chock 20*b*. In the illustrated example of FIGS. 9-11, the catch 72 includes a first portion 71 and a second portion 73, where the second portion 73 overhangs the first portion 71. More specifically, the downward facing surface 70 of the example catch 72 is defined by an underside surface 75 of the second portion 73 that overhangs the first portion 71. For example, as shown in FIG. 11, the catch 38 includes an upper surface 77, side surfaces 79, and the underside surface 75 (e.g., a horizontal or parallel surface; also identified as downward facing surface 70 in FIG. 9) that define an L-shaped profile. A leg 81 of the L-shaped profile defining the first portion 71 protrudes substantially vertically relative to a surface 83 of the track 58 (e.g., the surface 83 being substantially parallel to a longitudinal axis of the track 58). An arm 85 of the L-shaped profile defining the second portion 73 extends substantially perpendicular from the leg 81 and parallel relative to the surface 83 of the track 58.

In the unlatched position (FIGS. 9 and 10), latch 60 and alignment keys 48 engage or readily fit among the plurality of catches 72, so chock 20*b* can be placed onto or off of track 58.

Some examples of wheel restraint system 56 include a plurality of latches 60 extending downward from a common plate 74 that slides or otherwise translates along a guide surface 76 of chock 20*b*.

In operation, while wheel chock 20*b* is in a stored position at some location clear of the wheel's path, vehicle 14 backs into dock 16 and stops wheel 12 somewhere along the length of track 58. While latch member 60 is in the unlatched position, as shown in FIG. 9, a dockworker moves wheel chock 20*b* from the stored position to the wheel-blocking position of FIG. 10. In this example, after wheel chock 20*b* is engaged with and/or set upon track 58, the dockworker moves lever 64 from the unlock position (FIG. 10) to the lock position (FIG. 11), which moves latch member 60 from the unlatched position (FIG. 10) to the latched position (FIG. 11). Downward facing surface 70 of catch 72 overhanging upward facing surface 68 of latch member 60 helps hold wheel chock 20*b* to track 58 so that wheel chock 20*b* can reliably block the vehicle's forward movement away from dock platform 26 (FIGS. 7 and 8).

To release vehicle 14, lever 64 is moved from the lock position to the unlock position, which moves latch member 60 from the latched position to the unlatched position. In the unlatched position, latch 60 disengages relative to underneath catch 72, which allows wheel chock 20*b* to be readily removed or disengaged from within the plurality of catches 72 of track 58 and, thus, allows wheel chock 20*b* to be lifted or otherwise moved from the wheel-blocking position to a stored position.

The stored position can be any suitable location where chock 20*b* is spaced apart from track 58. Examples of stored positions include, but are not limited to, chock 20*b* being suspended above and off to one side of track 58, chock 20*b* being off to one side of track 58 and resting upon driveway 24, or chock 20*b* resting upon a shelf, cradle or hanging from a hook at some chosen location at dock 16. To facilitate movement of wheel chock 20*b* between the stored position and the wheel-blocking position, chock 20*b* can be connected to lift mechanism 30 that carries at least some the chock's weight.

It may also be desirable for wheel restraint system 10 to be equipped with a sensing and signaling assembly or apparatus. For example, wheel chock 20*a* could be equipped with a sensor for sensing the presence of a wheel. The sensor may be, for example, any suitable sensors/switches, including a mechanical contact switch, a pressure switch, an induction sensor, or a proximity sensor, etc. Wheel chock 20a could further be equipped with a second sensor or switch for detecting whether latch member 32 is in the latched position or unlatched position. As with the above, the latch/unlatch sensor may be any of a variety of sensors or switches, including a mechanical contact switch coupled to lever 44. These sensors or switches may be electrically coupled (e.g., wired or wirelessly) to a communication means such as a signal light, such that the signal light would indicate to an operator tasked with loading/unloading vehicle 14 that a safe condition exists when a wheel is sensed in proximity to the wheel chock, the wheel chock is engaged with the track, and/or the latch member is sensed to be in the latched position (e.g., a green light). In contrast, if either no wheel is sensed or the latch member is detected to be in an unlatched position, then the signal light would indicate that an unsafe condition exists with regard to loading/unloading the vehicle (e.g., a red light). Finally, the mechanism for moving the wheel chock (i.e., lift mechanism 30) also provides a good means for carrying and protecting the electrical cables coupling the sensors or switches with the communication means (e.g., a controller, a central processor, etc.). In some examples, one or more communications between, for example, the sensors, the signal light, the switches, communication means etc., may be wireless (e.g., via blue tooth, WI-FI, cellular, etc.).

Some of the aforementioned examples may include one or more features and/or benefits including, but not limited to, the following:

In some examples, a wheel chock's stored position is completely clear of the chock's track to facilitate sweeping or snow removal of the dock's driveway.

In some examples, a wheel chock can be latched onto a track after the chock is manually moved or its position adjusted to a desired wheel-blocking position.

In some examples, a wheel chock is positively latched to a chosen discrete position along a track, wherein the positive latching provides a greater holding force than what could be achieved by frictional clamping alone.

In some examples, a wheel chock can be positively latched to a track to prevent the chock from tipping over or moving out of position relative to a wheel.

In some examples, an unlatched wheel chock can be removed from a track by simply lifting the chock straight up from the track.

In some examples, a wheel chock in a wheel-blocking position rests entirely atop a metal track, thus protecting a softer driveway surface from being damaged by a wheel forcing the wheel chock downward.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A wheel restraint system for blocking a wheel at a loading dock that includes a driveway, the wheel restraint system comprising:
   a track mountable to the driveway, the track includes a plurality of discrete catches, each catch of the plurality of discrete catches includes a first surface;
   a wheel chock selectively movable between a stored position and a wheel-blocking position, the wheel chock in the stored position is spaced apart from the track, the wheel chock in the wheel-blocking position engages the track, the wheel chock including a rotatable lever with an axis; and
   a plurality of latch members attached to the wheel chock and being movable relative to the chock by connection with the lever, each latch member rotatably movable about a substantially vertical axis thereof and including a second surface, the latch members being selectively moveable via the rotatable lever between a latched position and an unlatched position relative to the wheel chock, the second surface of each latch member to engage a respective first surface when the movable latch members are in the latched position and the wheel chock is in the wheel-blocking position, the second surface being spaced apart from the first surface when the movable latch members are in the unlatched position and the wheel chock is positioned on the track.

2. The wheel restraint system of claim 1, wherein the axis of each latch member is in non-parallel alignment with the axis of the lever.

3. The wheel restraint system of claim 1, wherein the lever is rotatable relative to both the wheel chock and the latch members between a locked position and an unlocked position, the latch members move from the unlatched position to the latched position in response to the lever moving from the unlocked position to the locked position.

4. The wheel restraint of claim 1, further comprising a lift mechanism installable at the loading dock and connected to the wheel chock, the lift mechanism supports at least a portion of the wheel chock's weight as the wheel chock moves between the stored position and the wheel-blocking position.

5. The wheel restraint system of claim 4, wherein the lift mechanism comprises a hoist.

6. The wheel restraint system of claim 4, wherein the lift mechanism comprises an articulated arm.

7. A wheel restraint system for blocking a wheel at a loading dock that includes a driveway, the wheel restraint system comprising:
   a track mountable to the driveway, the track includes a plurality of discrete catches, each catch of the plurality of discrete catches includes a first surface;
   a wheel chock selectively movable between a stored position and a wheel-blocking position, the wheel chock in the stored position is spaced apart from the track, the wheel chock in the wheel-blocking position engages the track, the wheel chock including a substantially vertical outer side wall adjacent an outer side of the wheel;
   a lever extending from the outer side wall and rotatable about a lever axis extending substantially parallel relative to a width of the track;
   a plurality of latch members attached to the wheel chock and being movable relative thereto by connection with the lever, each latch member including a second surface facing a respective first surface, the lever being rotatable relative to both the wheel chock and the latch members between a locked position and an unlocked position, the latch members being selectively moveable via the lever between a latched position and an unlatched position relative to the wheel chock in response to the lever moving from the unlocked position to the locked position, the second surface to engage the respective first surface when the movable latch members are in the latched position and the wheel chock is in the wheel-blocking position, the second surface being spaced apart from the respective first surface when the movable latch members are in the unlatched position and the wheel chock is positioned on the track, wherein each of the latch members defines a first axis about which the latch member rotates upon moving between the latched position and the unlatched position, the lever rotating about the lever axis upon moving from the locked position to the unlocked position, the first axis and the lever axis being in non-parallel alignment with each other; and a lift mechanism installable at the loading dock and connected to the wheel chock, the lift mechanism supports at least a portion of the wheel chock's weight as the wheel chock moves between the stored position and the wheel-blocking position.

8. A wheel restraint system for blocking a wheel at a loading dock that includes a driveway, the wheel restraint system comprising:

a track mountable to the driveway, the track includes a plurality of discrete catches, each catch of the plurality of discrete catches includes a first surface;

a wheel chock selectively movable between a stored position and a wheel-blocking position, the wheel chock in the stored position is spaced apart from the track, the wheel chock in the wheel-blocking position engages the track, the wheel chock including a rotatable lever with an axis; and a plurality of latch members attached to the wheel chock and being movable relative to the chock by connection with the lever, each latch member rotatably movable about a substantially vertical axis thereof and including a second surface, the latch members being selectively moveable via the rotatable lever between a latched position and an unlatched position relative to the wheel chock, the second surface of each latch member to engage a respective first surface when the movable latch members are in the latched position and the wheel chock is in the wheel-blocking position, the second surface being spaced apart from the first surface when the movable latch members are in the unlatched position and the wheel chock is positioned on the track, wherein the first surface comprises a downward facing tapered portion adjacent a substantially vertical portion and the second surface comprises an upward facing tapered surface.

9. A wheel restraint method for blocking a wheel at a loading dock that includes a driveway, the wheel restraint method comprising:

lowering a wheel chock onto a track to position the wheel chock in wheel-blocking proximity with the wheel such that a track-engaging surface of the wheel chock engages the track, the wheel chock including a substantially vertical outer side wall adjacent an outer side of the wheel, and the track having a plurality of discrete catches each defining a body protruding from the track;

rotating a lever extending from the outer side wall of the chock about an axis extending substantially parallel relative to a width of the track to latch the wheel chock to the track by causing a plurality of latches movably coupled relative to the wheel chock to move between an unlatched position and a latched position, each latch to rotate about a substantially vertical axis so a surface of the latch engages a respective body when the plurality of latches are in the latched position.

10. The wheel restraint method of claim 9, wherein each body of the discrete catches includes a downward facing surface which is engaged, upon latching the plurality of latches of the wheel chock, with the surface of a respective latch.

11. The wheel restraint method of claim 9, wherein lowering the wheel chock onto the track involves the use of a hoist.

12. The wheel restraint method of claim 9, wherein lowering the wheel chock onto the track involves the use of an articulated arm.

13. The wheel restraint method of claim 9, wherein positioning the wheel chock in wheel-blocking proximity comprises aligning the plurality of latches of the wheel chock with the plurality of catches of the track.

14. The wheel restraint method of claim 9, wherein latching the wheel chock to the track comprises rotating the lever to cause the surfaces of the plurality of latches to frictionally engage the bodies of the plurality of catches.

15. A wheel restraint system for blocking a wheel at a loading dock that includes a driveway, the wheel restraint system comprising:

a track mountable to the driveway, the track includes a plurality of discrete catches, each catch of the plurality of discrete catches includes a first surface;

a wheel chock selectively movable between a stored position and a wheel-blocking position, the wheel chock in the stored position is spaced apart from the track, the wheel chock in the wheel-blocking position engages the track, the wheel chock including a rotatable lever with an axis; and a plurality of latch members attached to the wheel chock and being movable relative to the chock by connection with the lever, each latch member rotatably movable about a substantially vertical axis thereof and including a second surface, the latch members being selectively moveable via the rotatable lever between a latched position and an unlatched position relative to the wheel chock, the second surface of each latch member to engage a respective first surface when the movable latch members are in the latched position and the wheel chock is in the wheel-blocking position, the second surface being spaced apart from the first surface when the movable latch members are in the unlatched position and the wheel chock is positioned on the track, wherein the wheel chock includes a substantially vertical outer side wall adjacent an outer side of the wheel and the rotatable lever extends from the outer side wall and rotates about a lever axis extending substantially parallel relative to a width of the track.

16. The wheel restraint system of claim 15, wherein each of the catches has an upper surface, side surfaces extending from respective ends of the upper surface, and a downward facing surface being an angled surface extending between an end of one of the side surfaces and the surface of the track.

* * * * *